United States Patent [19]
Zugai

[11] 3,977,475
[45] Aug. 31, 1976

[54] LAWN EDGER
[76] Inventor: Charles Zugai, 2011 Bandera Road No. 1009, San Antonio, Tex. 78228
[22] Filed: Sept. 29, 1975
[21] Appl. No.: 617,953

[52] U.S. Cl. .................................. 172/15; 56/233; 172/17
[51] Int. Cl.² ......................................... A01D 35/00
[58] Field of Search .............................. 172/13–17; 56/251, 233–235

[56] References Cited
UNITED STATES PATENTS

| | | | |
|---|---|---|---|
| 2,538,230 | 1/1951 | Boggs | 172/16 X |
| 2,555,441 | 6/1951 | Hackney | 172/15 |
| 2,630,747 | 3/1953 | Mintz | 172/15 |
| 2,739,437 | 3/1956 | True | 172/15 X |
| 3,690,384 | 9/1972 | Patterson | 172/15 |
| 3,734,196 | 5/1973 | Mangum | 172/16 |

*Primary Examiner*—Paul E. Shapiro
*Attorney, Agent, or Firm*—Cox, Smith, Smith, Hale & Guenther Incorporated

[57] ABSTRACT

This invention is for a lawn edger. The edger has a strong unitary base mounted on a middle row of wheels and may be tilted backwards onto a rear roller. A motor is mounted on top of the base and a handle connects to the rear of the base. A cutter extends forward of the base and is held into position by a pair of forwardly extending rods. The cutter, which turns in a direction to throw any debris forward of the edger, is driven by a belt from the motor. A spring operating against one of the rods keeps a constant tension on the drive belt. A shield surrounds the cutter and has a guide with a lower rear position extending below the cutting blade. The edger may be run on a flat solid surface without the blade striking the surface. The edger is balanced with the middle row of wheels being the approximate center of gravity. The edger can tilt forward to the cutting position or rearward against the rear roller.

10 Claims, 3 Drawing Figures

LAWN EDGER

BACKGROUND OF THE INVENTION

This invention relates to lawn edgers and, more particularly, to a centrally balanced lawn edger of very rugged construction that is particularly adapted for edging along curbs and other uneven surfaces.

BRIEF DESCRIPTION OF THE PRIOR ART

Prior to the present invention, conventional lawn edgers normally had three wheels with the cutting portion being located in the front thereof. The three wheel type of lawn edger with the spaced apart front wheels was very unsuitable for edging along concrete curbs. In the prior edgers, if the edger was moved onto a flat solid surface, the blade would strike the solid surface possibly resulting in damage to the blade or other portions of the edger.

A common problem with edgers currently being sold involves the bending or warping of the shaft that connects to the motor. If the shaft is ever warped, it is many times cheaper to simply buy a new edger than to replace or repair the shaft.

Also the edgers currently being sold are hard to maneuver while edging due to the improper balance of the machine. The blades on conventional edgers when viewed from the cutting side are normally rotating into the grass being cut thereby kicking the cuttings back toward the operator of the edger. Prior edgers that were belt driven also had the problem of keeping a constant tension on the belt to prevent slippage.

SUMMARY OF THE INVENTION

It is an object of the present invention to provide a lawn edger that is very rugged, strong and efficient to operate.

It is another object of the present invention to provide an edger that can edge along curbs.

It is still another object of the present invention to provide an edger having three axles with wheels thereon with the center set of wheels being the approximate center of gravity of the edger. The edger may tilt forward to a first position for edging, or backward to a second position when the edger is not cutting.

It is yet another object of the present invention to provide an edger having a strong unitary body construction with a cutter extending on projections in the front thereof. The cutter is driven by a belt drive from a motor with the belt being kept at a constant tension by a spring force on the extensions.

It is even another object of the present invention to provide a multiplicity of wheels wherein the edger may ride freely along a curb during the edging process.

The edger consists basically of a unitary body construction having a motor mounted thereon. In the approximate center of the body is located a plurality of wheels along a center axis with a roller being located at the lower rear of the body. Extensions project through the front of the body and carry a housing which contains a shaft to which the cutter is attached. The shaft is driven by a belt drive from the motor with the belt being kept at a constant tension by spring force on the projections. The cutter has a protective housing therearound with a lower extending guide on the protective housing. The guide prevents the cutting blade from striking a level surface if the guide was resting on the surface. A guide wheel is attached to the protective housing so that the edger may follow freely along a rounding curb.

BRIEF DESCRIPTION OF THE PREFERRED EMBODIMENT

Figure 1:
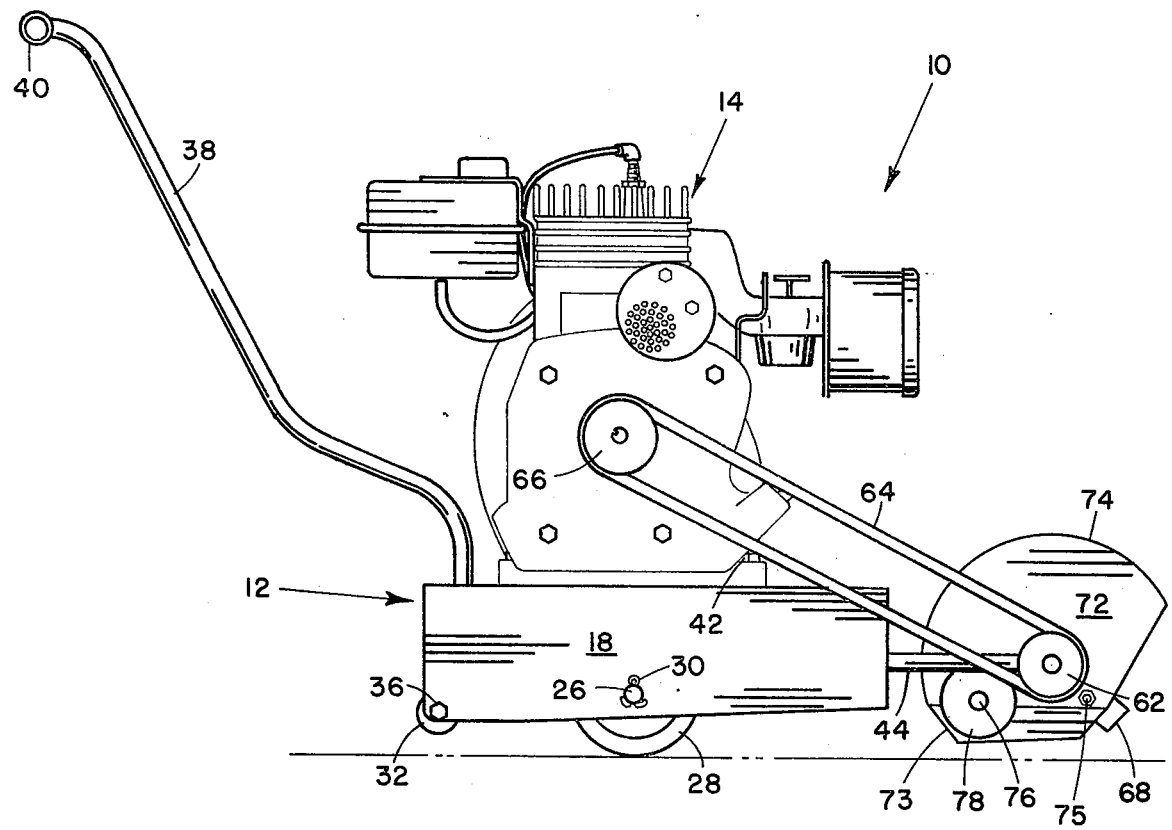
FIG. 1 is an elevated view of the right side of an edger.
Figure 3:
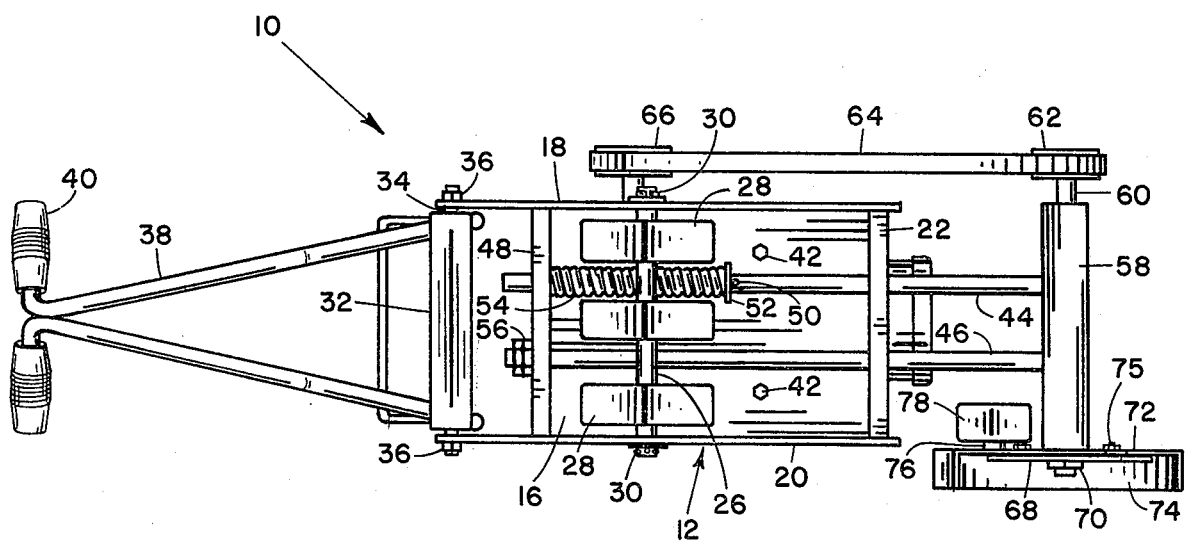
FIG. 3 is a bottom view of FIG. 1.
Figure 2:
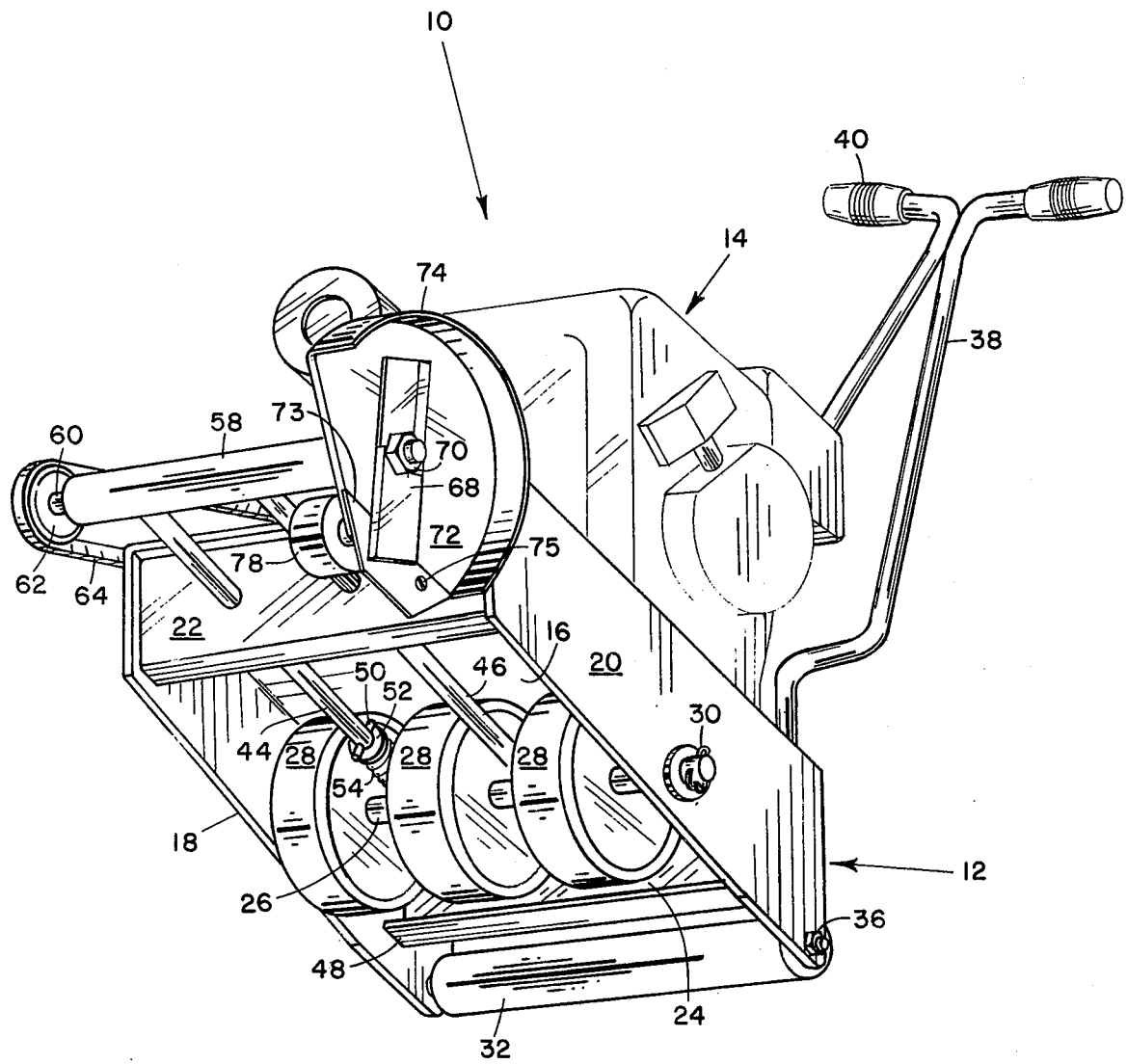
FIG. 2 is a lower perspective view of FIG. 1.

Referring now to FIGS. 1, 2 and 3 in combination, there is shown an edger represented generally by the reference numeral 10. The edger consists of a base frame 12 with a gasoline operated engine 14 located thereon. The base frame 12 which is essentially a box shaped structure has a flat upper surface 16, sides 18 and 20, front 22 and rear 24.

Extending between sides 18 and 20 is a center axle 26 on which is mounted a plurality of wheels 28. The drawings for the present invention showing a total of three wheels 28, but this number may vary. The center axle 26 is held in position by pins 30. Each of the wheels 28 may have internal bearings (not shown) to allow ease of rotation around central axle 26.

To the lower rear of the base frame 12 is located a roller 32 which is contained between sides 18 and 20 by means of rear axle 34. Rear axle 34 is held in position by nuts 36. The roller 32 is located below and rearward of the lowermost portion of the rear 24 of base frame 12 so that it will not rub thereagainst.

Extending through the rear portion of the flat upper surface 16 are handles 38 having hand grips 40 located on the upper end thereof. The handles 38 are held in position inside of base frame 12 by means of pins (not shown). The engine 14 is also mounted on the flat upper surface 16 and is held in position by bolts 42. The engine 14 is mounted so that the approximate center of gravity of the entire edger 10 is directly above central axle 26.

Extending through holes in front 22 of base frame 12 are cutter support rods 44 and 46. The cutter support rods 44 and 46 (which are substantially parallel) extend inside of base frame 12 and through holes in rear 24. A flange 48 gives extra strength to base frame 12. Cutter support rod 46 has a pin 50 and washer 52 located approximately half the distance between rear 24 and front 22. Between the pin 50 and its associated washer 52 and rear 24 is located spring 54. Nut 56 which is located on the end of cutter support rod 46 simply prevents the removal of the cutter support rods 44 and 46 from base frame 12, but nut 56 is not tightened for reasons that will be subsequently given.

On the forward end of cutter support rods 44 and 46 is attached cutter shaft housing 58. Cutter shaft 60 extends through cutter shaft housing 58. Bearings (not shown) are located between cutter shaft 60 and cutter shaft housing 58 to insure a free rotation of the cutter shaft 60. On one end of the cutter shaft 60 is located a pulley 62 which is connected by means of a belt 64 to pulley 66 of engine 14. When the engine 14 is running, pulley 66 will turn thereby turning cutter shaft 60. On the opposite end of cutter shaft 60 is located cutting blade 68 which is secured in position by nut 70. Between the cutting blade 68 and cutter shaft housing 58 is located a plate 72 to which is attached guide 73 countersunk screws 75. The guide 73 extends downward from the cutter shaft 60. The upper portion of the plate 72 contains a safety shield 74 to prevent objects from hitting the operator of the edger 10. Attached to the lower portion of the plate 72 is a front axle 76 on which is mounted front wheel 78. It should be realized that the front axle 76 does not extend through plate 72 in such a manner as to interfere with the rotation of the cutting blade 68.

METHOD OF OPERATION

In normal use of the edger 10 wheels 28 extend below roller 32 and front wheel 78. (See FIG. 1). The various components of the edger 10 including engine 14 are mounted to the base frame 12 in such a manner that the center of gravity of the edger 10 is directly above wheels 28. Therefore, with very little force on handle grips 40, the edger 10 will tilt backwards onto roller 32 or forward against front wheel 78 when cutting. Roller 32 allows for ease of movement of the edger 10 on normal surfaces when not edging. Also edger 10 may be further tilted onto roller 32 entirely to allow for easy movement onto or off a curb. However, when edger 10 is not cutting and on a level surface, the lower rear portion of guide 73 will rest on the surface prior to cutting blade 68 striking the surface or front wheel 78 coming to rest against the surface. This prevents damage to the cutting blade 68 if the engine 14 of the edger 10 is running and the edger 10 is tilted forward on a flat surface such as concrete.

The spring 54 acting against pin 50 and washer 52 continually urges the cutter shaft housing 58 and cutter shaft 60 forward. This keeps a constant tension on belt 64 thereby preventing slippage during normal operation; however, allowing some slippage if the cutting blade 68 may strike a solid object. Also if the blade 68 should strike a solid object, the nut 70 may loosen to prevent damage to the edger or injury. If nut 70 loosens the blade 68 will stop turning. It should be understood that nut 56 is not tightened thereby allowing spring 54 to constantly urge shaft 58 forward. Nut 56 is simply to prevent the removal of the entire cutting portion from base frame 12 unless desired, regardless of belt 24.

In actual operation the edger 10 would be tilted forward so that front wheel 78 would rest on the surface being edged. By the use of a plurality of wheels 28 the edger 10 may be used on uneven surfaces such as curbs and the like. The front wheel 78 would ride on the curb immediately adjacent the edger. Wheels 28 follow along on the uppermost portion of the curb. In normal operation roller 32 may not even touch the curb. Guide 73 is particularly important when edging around sharp curves. By moving the edger 10 backwards, the guide 73 may ride against the sharp curve without any danger of the blade 68 striking the curb. Upon completion of the edging, the edger 10 may be tilted backward onto roller 32 so that neither front wheel 78, cutting blade 68 nor guide 73 touch the surface.

Viewing FIG. 2 from the side having the cutting blade 68, the cutting blade 68 is rotating in a clockwise direction thereby kicking any dirt, grass or other debris forward of the edger thereby preventing possible injury to the operator. Conventional edgers rotate in the opposite direction and kick the debris toward the operator.

It should be understood that the edger 10 is made from a very solid construction with a quarter inch steel being typical for the base frame 12 and raised bosses being used on sides 18 and 20 around central axle 26 and rear axle 34. The holes through which cutter support rods 44 and 46 extend are just large enough to receive the rods 44 and 46 thereby preventing a loose fit which could result in increased wear of the cutter support rods 44 and 46 or base frame 12.

If the cutting blade 68 should strike a solid object (the probability of which has been greatly reduced with the present edger 10) that could possibly result in damage to the cutting blade 68 or shaft 60, it may be very easily repaired on edger 10. By simply removing cutting shaft 60 it may be either straightened or replaced. If the cutting blade 68 was bent, it may be straightened in position by use of a hammer without the necessity of removing from edger 10. The strength results from the use of cutter shaft housing 58 around an elongated cutter shaft 68.

I claim:
1. An edger comprising:
a base frame having an upper surface, sides and a front, handle means connecting to said base frame for moving said edges;
central axle means for supporting a plurality of wheel means connected to said sides of said base frame, a plurality of first wheel means for supporting said base frame above the ground rotatable on said central axle means;
second wheel means for supporting said base frame connected to the rear of said sides;
a cutter head;
extension means from said base frame for supporting said cutter head in front of said edger;
shaft means of said cutter head rotatably connected to said extension means, said shaft means carrying means for cutting on one end thereof;
motor means for powering said cutting means mounted on said base frame, said motor means turning said shaft means;
guide means adjacent said cutting means for following a surface to be trimmed, said guide means having a third wheel means connected thereto for rotation on said surface;
said edger being balanced above said first wheel means so that said edger may be tilted backwards on said second wheel means and forward on said third wheel means and remain in either respective position if no force is acting thereon.

2. The edger as recited in claim 1 wherein said guide means extends below said cutting means to prevent said cutting means from striking a flat surface.

3. The edger as recited in claim 2 wherein a drive connection extends between said motor means and said shaft, and said extension means includes resilient force means for urging said cutter head forward to maintain a constant force on said drive connection.

4. The edger as recited in claim 3 wherein said base frame includes a substantially vertical inner wall, said extension means includes a plurality of rods extending through said inner wall and said front for supporting said cutter head, said resilient force means acting between said inner wall and said rods.

5. The edger as recited in claim 1 wherein said cutter head includes means for housing said shaft means, said housing means connecting to said extension means and said guide means.

6. The edger as recited in claim 5 wherein a lower rear edge of said guide means extends below said cutting means.

7. The edger as recited in claim 1 wherein said first wheel means includes at least three wheels on said central axle means.

8. The edger as recited in claim 7 wherein said second wheel means is a roller reaching from one side substantially to the other side of said base frame.

9. The edger as recited in claim 1 wherein said cutting means has a direction of rotation to throw debris of said cutting means forward of said edger.

10. The edger as recited in claim 9 wherein said base frame is constructed from approximately one quarter inch thick iron material and has raised boss means for connecting each axle means.

* * * * *